United States Patent
Ito

(10) Patent No.: US 10,657,723 B2
(45) Date of Patent: May 19, 2020

(54) IMAGE PROCESSING APPARATUS AND IMAGE PROCESSING METHOD

(71) Applicant: CANON KABUSHIKI KAISHA, Tokyo (JP)

(72) Inventor: Koji Ito, Inagi (JP)

(73) Assignee: Canon Kabushiki Kaisha, Tokyo (JP)

(\*) Notice: Subject to any disclaimer, the term of this patent is extended or adjusted under 35 U.S.C. 154(b) by 0 days.

(21) Appl. No.: 16/019,970

(22) Filed: Jun. 27, 2018

(65) Prior Publication Data

US 2019/0005729 A1  Jan. 3, 2019

(30) Foreign Application Priority Data

Jun. 28, 2017 (JP) ................................ 2017-126770

(51) Int. Cl.
| | | |
|---|---|---|
| *G06T 19/00* | (2011.01) | |
| *G06K 9/00* | (2006.01) | |
| *G06T 13/80* | (2011.01) | |
| *G06K 9/32* | (2006.01) | |
| *G06K 9/20* | (2006.01) | |

(52) U.S. Cl.
CPC ........ *G06T 19/006* (2013.01); *G06K 9/00671* (2013.01); *G06K 9/2081* (2013.01); *G06K 9/3208* (2013.01); *G06T 13/80* (2013.01)

(58) Field of Classification Search
CPC ............... G06T 19/006; G06T 11/60; G06T 2207/20212; G06T 2207/20221; G06T 13/80; G06K 9/00671; G06K 9/2018; G06K 9/3208
See application file for complete search history.

(56) References Cited

U.S. PATENT DOCUMENTS

| | | |
|---|---|---|
| 5,617,138 A | 4/1997 | Ito et al. |
| 5,930,528 A | 7/1999 | Ito et al. |
| 6,147,704 A | 11/2000 | Ito et al. |
| 6,529,644 B2 | 3/2003 | Ito et al. |
| 6,809,757 B1 | 10/2004 | Ito et al. |
| 10,339,383 B2* | 7/2019 | Lee ........................ G06F 3/1243 |
| 2013/0222367 A1* | 8/2013 | Mariappan ............. G06Q 30/02 345/419 |
| 2017/0345197 A1* | 11/2017 | Sakai ....................... G06T 11/60 |

FOREIGN PATENT DOCUMENTS

JP        2013-026922 A     2/2013

\* cited by examiner

*Primary Examiner* — Ryan R Yang
(74) *Attorney, Agent, or Firm* — Venable LLP

(57) ABSTRACT

An image processing apparatus that embeds additional information relating to an object that is displayed in a superimposing manner on a captured image, in an original image. The image processing apparatus includes a determining unit configured to determine whether a direction of the original image is a landscape or a portrait, and an embedment unit configured to embed the additional information in the original image. The additional information is information capable of at least specifying a type of the object and a display direction, of the object with respect to a display screen, in a case of displaying the object in a superimposing manner on the captured image. The embedment unit embeds the additional information based on the determination by the determining unit, such that the display direction changes in accordance with whether the direction of the original image is the landscape or the portrait.

22 Claims, 16 Drawing Sheets

| IndexNo | Category | Display method | Animation |
|---|---|---|---|
| 1 | wedding #1 | portrait | Happy ♥ ♥ ♥ ♥ Wedding |
| 2 | wedding #1 | landscape | Happy Wedding ♥♥♥ ♥♥♥ |
| 3 | wedding #2 | portrait | Happy ★ ★ ★ ★ Wedding |
| 4 | wedding #2 | landscape | Happy Wedding ★★★ ★★★ |

IMAGE PROCESSING APPARATUS AND IMAGE PROCESSING METHOD

BACKGROUND OF THE INVENTION

This application claims the benefit of Japanese Patent Application No. 2017-126770, filed Jun. 28, 2017, which is hereby incorporated by reference wherein in its entirety.

FIELD OF THE INVENTION

The present invention relates to embedment of information in printed matter and a display method of embedded information.

DESCRIPTION OF THE RELATED ART

In recent years, there is a technique, such as AR (Augmented Reality). AR is a technique to produce an augmented representation by adding another piece of information to information a person can perceive in the real world. As an example of a practical use of AR, for example, there is a case when additional information (also referred to as multiplexed information or embedded information) is displayed in a superimposing manner on an image obtained by performing scanning by a camera included in a mobile terminal, such as a smartphone and a tablet.

Further, there is a technique to embed additional information in printed matter (hereafter, described as an information multiplexing technique). Then, it is possible to extract additional information embedded in printed matter by the information multiplexing technique by reading (scanning) the printed matter by a camera, and the like.

By using the AR technique and the information multiplexing technique, it is made possible to display additional information for augmented reality in a superimposing manner on a scanned image (see Japanese Patent Laid-Open No. 2013-026922). For example, as shown in FIG. 16A and FIG. 16B, it is possible to display animation or a desired message in a superimposing manner on a scanned image obtained by scanning printed matter (a photo, and the like). Hereafter, animation or a message displayed in a superimposing manner on a scanned image is referred to as a decoration message.

In FIG. 16A, the way a scanned image 1602 is displayed on a screen 1601 of a mobile terminal is shown. The scanned image 1602 is an image obtained by scanning a photo whose object is four persons by a camera of a mobile terminal. In FIG. 16B, an example of a decoration message is shown. The message "Happy Wedding" shown at the top in FIG. 16B and heart marks shown at the bottom in FIG. 16B are moving image animation, and the color changes and the characters and marks move at the time of reproduction. Further, the message shown at the center in FIG. 16B is a message that a user can add arbitrarily. By embedding information necessary to display the decoration message shown in FIG. 16B in printed matter, such as a photo, as additional information, as shown in FIG. 16C and FIG. 16D, it is made possible to display the decoration message in a superimposing manner on the scanned image.

However, for example, a case is supposed in which scan-target printed matter is vertically long and animation that is superimposed on a scanned image is animation suitable to a landscape, as shown in FIG. 16B. In this case, the direction of the printed matter and the direction of the animation do not match in the state shown in FIG. 16C. Further, it is supposed that the animation automatically rotates in accordance with the direction of the mobile terminal in the case when a user matches the direction of the screen 1601 of the mobile terminal with that of the vertically long printed matter. Then, as shown in FIG. 16D, there may occur a case when the decoration message in the landscape display method is not included within the scanned image in the vertical direction. As described above, there is a case when an object, such as animation, is not displayed as a creator intends.

Consequently, an object of the present invention is to provide an image processing apparatus capable of embedding additional information so that an appropriate object corresponding to the display direction in accordance with the direction of an original image is displayed.

SUMMARY OF THE INVENTION

The image processing apparatus according to the present invention is an image processing apparatus that embeds information relating to an object that is displayed in a superimposing manner on a captured image, in print data of a printed matter as additional information, the image processing apparatus including an embedment unit configured to embed information capable of at least specifying a display direction in accordance with a direction of an original image of the printed matter and a type of the object in a case of displaying the object in a superimposing manner on the captured image in the print data as the additional information, wherein the captured image includes an image obtained by capturing the printed matter.

Further features of the present invention will become apparent from the following description of exemplary embodiments with reference to the attached drawings.

DESCRIPTION OF THE EMBODIMENTS

In the following, preferred embodiments of the present invention are explained in detail with reference to the attached drawings. The following embodiments are not intended to limit the present invention according to the scope of the claims and all combinations of features explained in the embodiments are not necessarily indispensable to the solution of the present invention.

First Embodiment

<Configuration of Terminal Apparatus>

Figure 1:
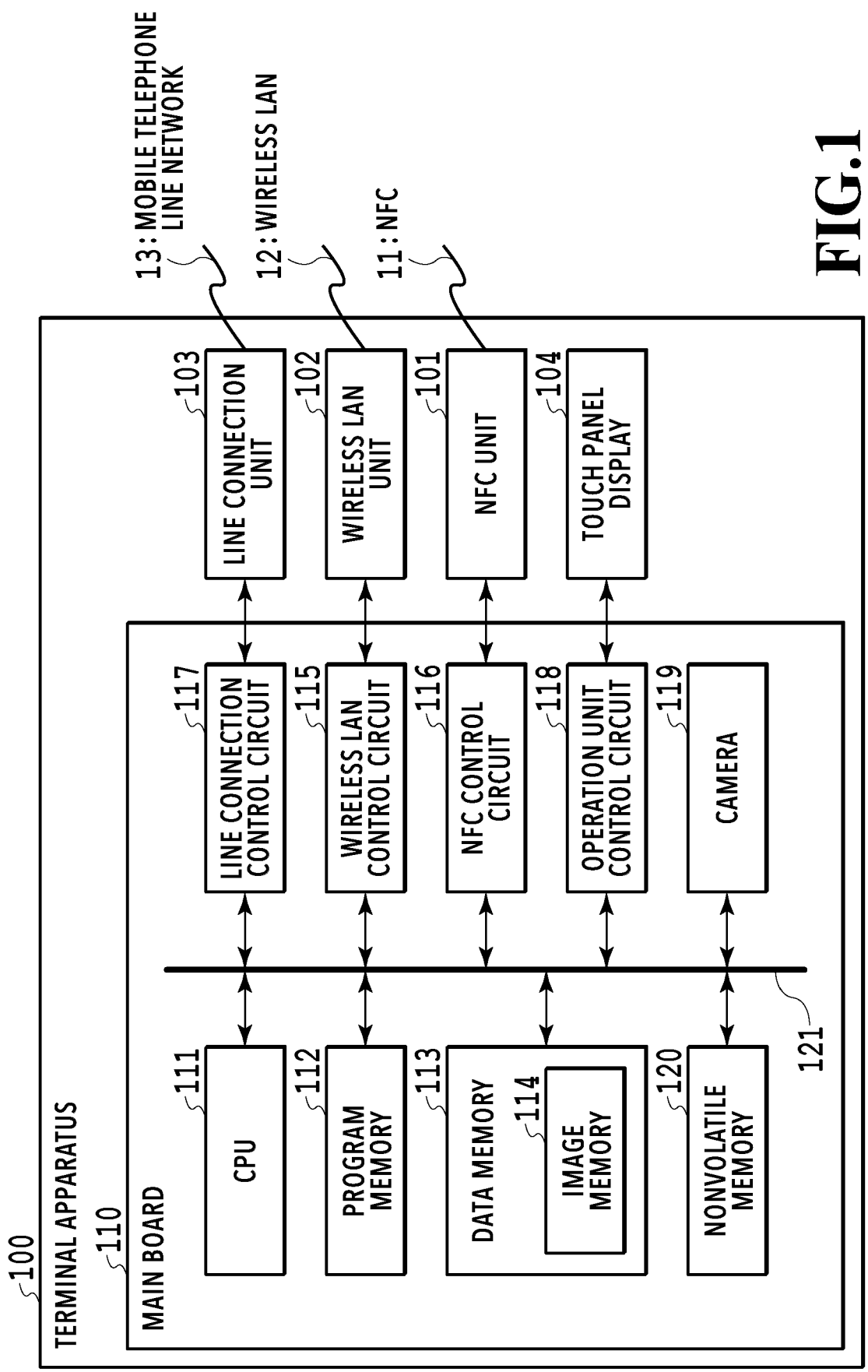
FIG. 1 is a block diagram showing a configuration of a terminal apparatus according to a first embodiment.

FIG. 1 is a block diagram showing a configuration of a terminal apparatus (hereafter, also referred to as information processing apparatus or an image processing apparatus) according to a first embodiment. A terminal apparatus 100 is a mobile terminal, such as a smartphone and a tablet. The terminal apparatus includes a main board 110 that controls the entire terminal apparatus, a nearfield communication (NFC) unit 101, a wireless local area network (LAN) unit 102, a line connection unit 103, and a touch panel display 104. The NFC unit 101, the wireless LAN unit 102, and the line connection unit 103 are each connected with an NFC 11, a wireless LAN 12, and a mobile telephone line network 13, respectively.

The main board 110 includes a CPU 111, a program memory 112, a data memory 113, a wireless LAN control circuit 115, an NFC control circuit 116, a line connection control circuit 117, an operation unit control circuit 118, a camera 119, and a nonvolatile memory 120. Each of these components is connected to one another via an internal bus 121.

The CPU 111 in the form of a microprocessor operates in accordance with control programs stored in the program memory 112 in the form a ROM and contents of data stored in the data memory 113 in the form of a RAM. Further, the CPU 111 communicates with another apparatus connected to the wireless LAN 12 by controlling the wireless LAN unit 102 via the wireless LAN control circuit 115. Further, the CPU 111 is capable of detecting another NFC terminal connected to the NFC 11 and performing transmission and reception of data with another NFC terminal by controlling the NFC unit 101 via the NFC control circuit 116. Further, the CPU 111 is capable of connecting to the mobile telephone line network 13 and performing transmission and reception of voice data, and the like, by controlling the line connection unit 103 via the line connection control circuit 117. Further, the CPU 111 is capable of displaying information about a printer on the touch panel display 104 and receiving a user operation for the touch panel display 104 by controlling the operation unit control circuit 118. Further, the CPU 111 is capable of capturing an image by controlling the camera 119 and stores image data obtained by image capturing in an image memory 114 of the data memory 113. Further, the CPU 111 is also capable of storing image data acquired from the outside through the mobile telephone line network 13, the wireless LAN 12, or the NFC 11, other than image data obtained by image capturing, in the image memory 114 and transmitting image data to the outside.

The nonvolatile memory 120 includes a memory, such as a flash memory, and is capable of retaining stored data even in the case when the power source is turned off. In the nonvolatile memory 120, for example, image data and programs, such as software for causing the terminal apparatus 100 to implement various functions, are stored, in addition to telephone directory data, various kinds of pieces of communication connection information, information on devices that were connected in the past, and so on. In the nonvolatile memory 120, an image processing application, to be described later, and animation management information and animation data managed by the image processing application are also stored. Further, an operating system (OS) for causing the image processing application to operate is also stored.

<Configuration of Printing Apparatus>

Figure 2:
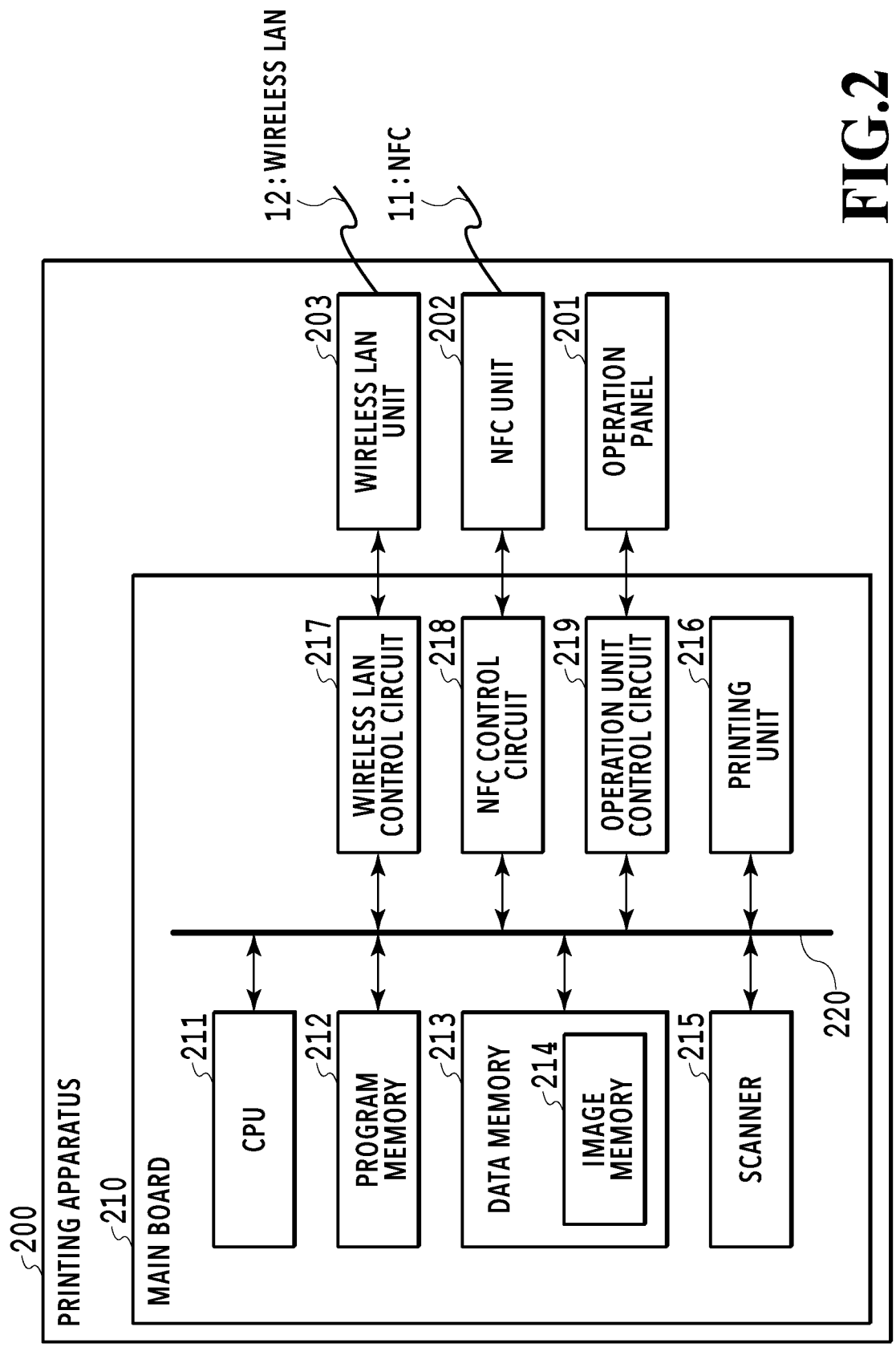
FIG. 2 is a block diagram showing an example of a configuration of a printing apparatus that is connected with the terminal apparatus shown in FIG. 1.

FIG. 2 is a block diagram showing an example of a configuration of a printer (printing apparatus) connected with the terminal apparatus shown in FIG. 1 via the wireless LAN 12. A printing apparatus 200 includes a main board 210 that controls the entire printing apparatus, an operation panel 201, an NFC unit 202, and a wireless LAN unit 203. The NFC unit 202 and the wireless LAN unit 203 function as a communication unit of the printing apparatus 200.

The main board 210 includes a CPU 211, a program memory 212, a data memory 213, a scanner 215, a printing unit 216, a wireless LAN control circuit 217, an NFC control circuit 218, and an operation unit control circuit 219. Each of these components is connected to one another via an internal bus 220.

The CPU 211 in the form of a microprocessor operates in accordance with control programs stored in the program memory 212 in the form of a ROM and contents of data stored in the data memory 213 in the form of a RAM. Further, the CPU 211 reads a document by controlling the scanner 215 and stores in an image memory 214 of the data memory 213. Further, the CPU 211 is capable of printing image data in the image memory 214 of the data memory 213 on a printing medium by controlling the printing unit 216. Further, the CPU 211 is also capable of transmitting image data obtained by scanning a document to the terminal apparatus 100 or another apparatus connected to the wireless LAN 12 by controlling the wireless LAN unit 203 via the wireless LAN control circuit 217. Further, the CPU 211 is capable of detecting another NFC terminal connected to the NFC 11 and performing transmission and reception of data with another NFC terminal by controlling the NFC unit 202 via the NFC control circuit 218. Further, the CPU 211 is capable of displaying the state of the printing apparatus 200 and a function selection menu on the operation panel 201 and receiving a user operation for the operation panel 201 by controlling the operation unit control circuit 219. It is assumed that the printing apparatus 200 in the present embodiment is capable of printing data in the JPEG file format to which a printer control command is given.

<Processing Flow>

Figure 3:
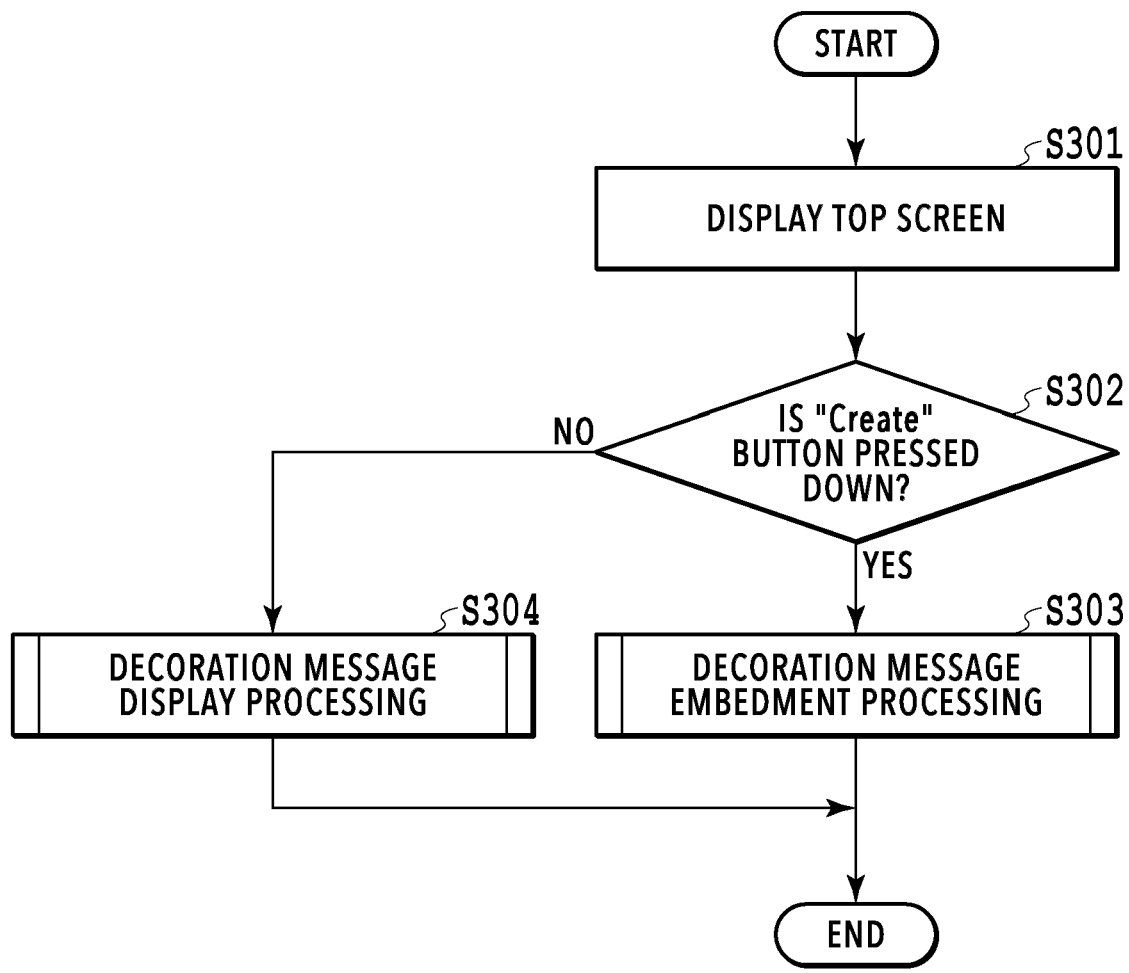
FIG. 3 is a flowchart showing an operation of an image processing application according to the first embodiment.

With reference to FIG. 3, an image processing application according to the first embodiment is explained. FIG. 3 is a flowchart showing the operation of the image processing application in the first embodiment. The expression "the application performs processing," or the like, is used, but, specifically, this means that the CPU 111 of the terminal apparatus 100 performs processing in accordance with the application.

Figure 4:
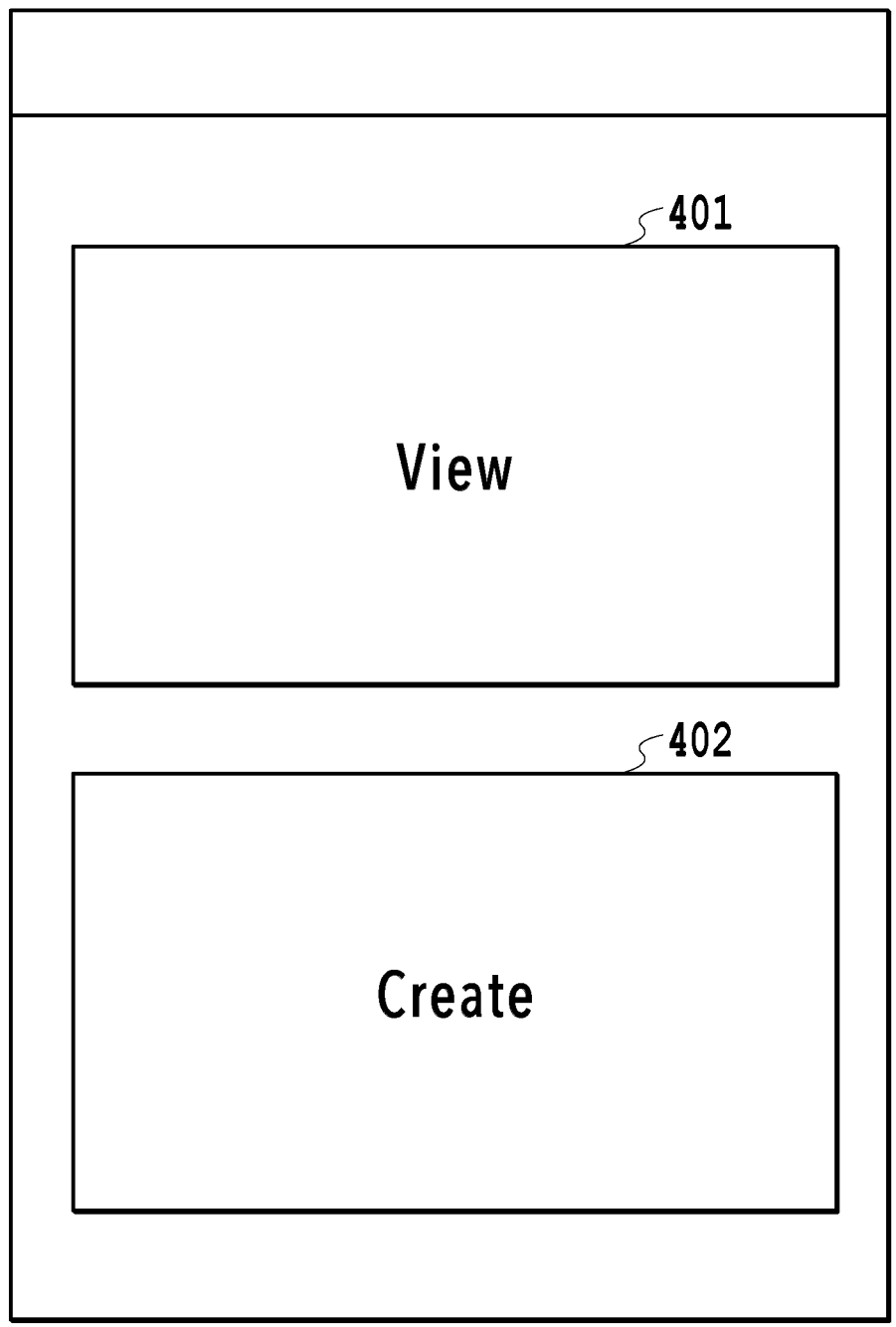
FIG. 4 is a diagram showing an example of a top screen of the image processing application.

A user activates the image processing application by operating the touch panel display 104 of the terminal apparatus 100. Then, the image processing application displays a top screen shown in FIG. 4 (step S301). As shown in FIG. 4, on the top screen, a "View" button 401 and a "Create" button 402 are displayed. The image processing application checks whether one of the "View" button 401 and the "Create" button 402 is tapped by a user (step S302).

In the case when the "Create" button 402 is tapped (YES at step S302), the image processing application makes a transition into decoration message embedment processing (also referred to as decoration message multiplexing processing) (step S303). The decoration message embedment processing is processing to generate print data in which a decoration message for decorating a scanned image is embedded and will be described later with reference to FIG. 5. In the case when the "View" button 401 is tapped (NO at step S302), the image processing application makes a transition into decoration message display processing (step S304). The decoration message display processing is processing to display a decoration message in a superimposing manner on an image obtained by scanning printed matter and will be described later with reference to FIG. 13.

<Decoration Message Embedment Processing>

Figure 5:
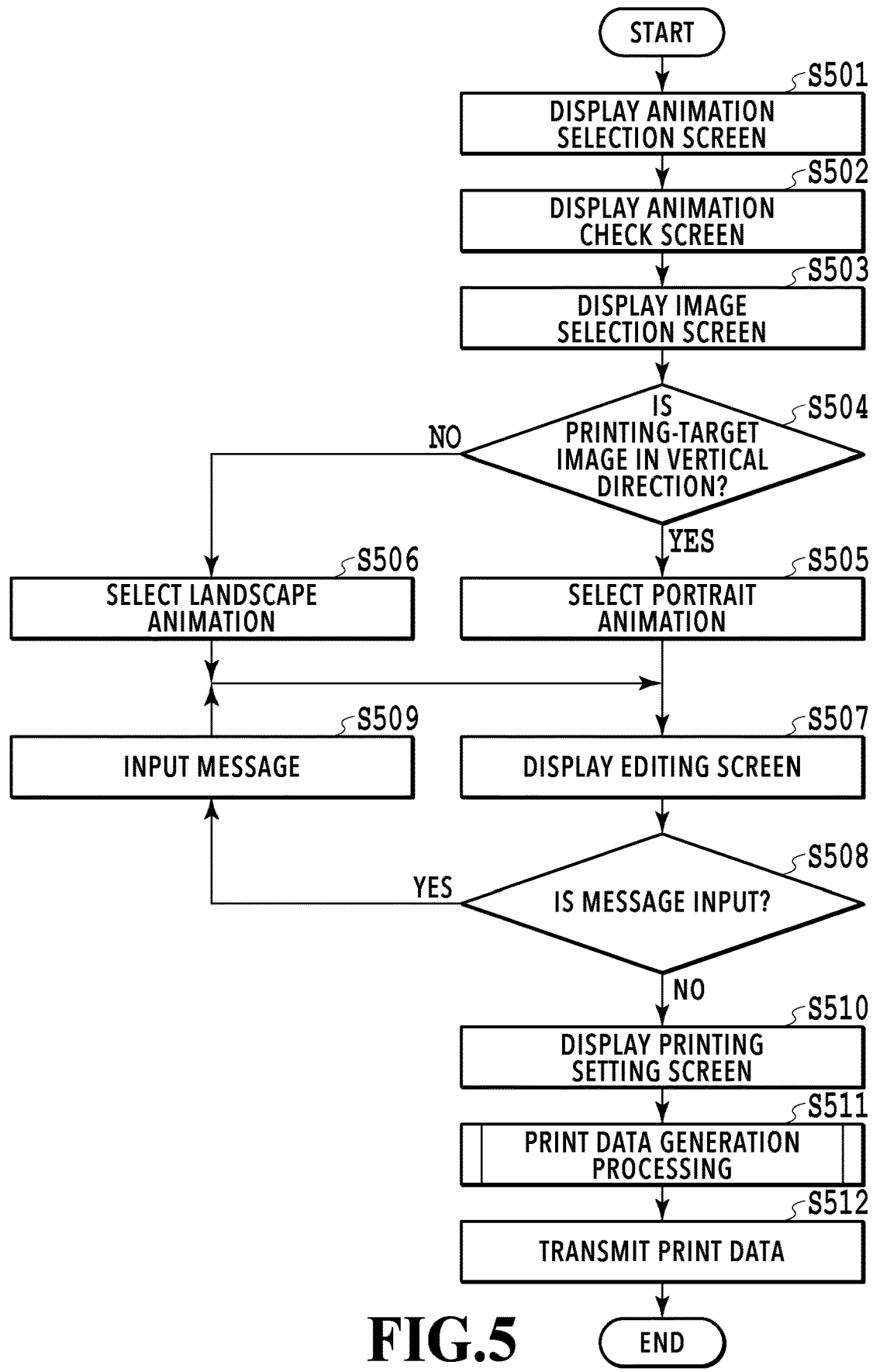
FIG. 5 is a flowchart showing decoration message embedment processing.

FIG. 5 is a flowchart showing the decoration message embedment processing. After making a transition into the decoration message embedment processing, the image processing application displays an animation selection screen shown in FIG. 6A (step S501). On the animation selection screen, buttons 601 to 604, for causing a user to select an object (here, animation) that is displayed as a decoration message, are arranged. A user selects animation that is displayed in a superimposing manner on a scanned image by operating the animation selection screen. In the present embodiment, it is assumed that animation is classified into two categories: wedding and birthday. Further, it is assumed that, in the category of wedding, two kinds of animation, that is, wedding #1 and wedding #2 are included and, in the category of birthday, two kinds of animation, that is, birthday #1 and birthday #2 are included. The buttons 601 and 602 correspond to wedding #1 and wedding #2, respectively. The buttons 603 and 604 correspond to birthday #1 and birthday #2, respectively.

Figures 6A, 6B:
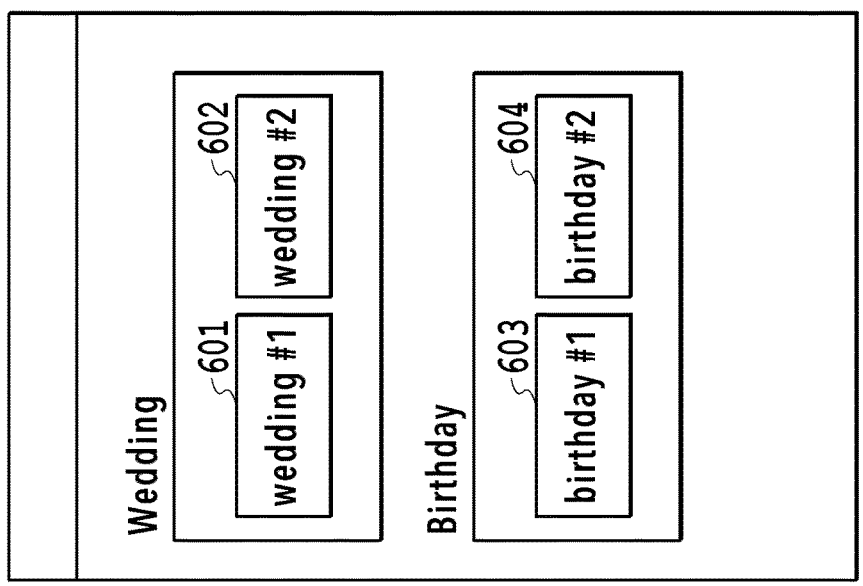
FIG. 6A and FIG. 6B are diagrams showing an example of an animation selection screen and an example of animation management information.

In FIG. 6B, an example of a management table (hereafter, called animation management information) for the image processing application to manage animation is shown. For simplification of explanation, in FIG. 6B, only information relating to the animation (wedding #1, wedding #2) belonging to the category of wedding is described, but the animation belonging to the category of birthday is similarly managed.

The image processing application manages the type of animation, the display method, and animation data by using the animation management information. In the animation management information, as shown in FIG. 6B, for each type of animation, the animation data of the portrait display method and the animation data of the landscape display method are stored. Then, IndexNo capable of specifying animation is given to each piece of animation data. That is, IndexNo is identification information allocated uniquely to each piece of animation data. For example, to the animation data of the portrait display method of wedding #1, IndexNo #1 is given and to the animation data of the landscape display method of wedding #1, IndexNo #2 is given. It is assumed that the animation data in the present embodiment is described by using HTML5 Canvas. However, as long as it is possible to display animation in a superimposing manner on a scanned image, another description method may be adopted. Further, it may also be possible to store the location (address, and the like) where animation data is saved in the animation management information in place of storing the animation data itself.

Figure 7:
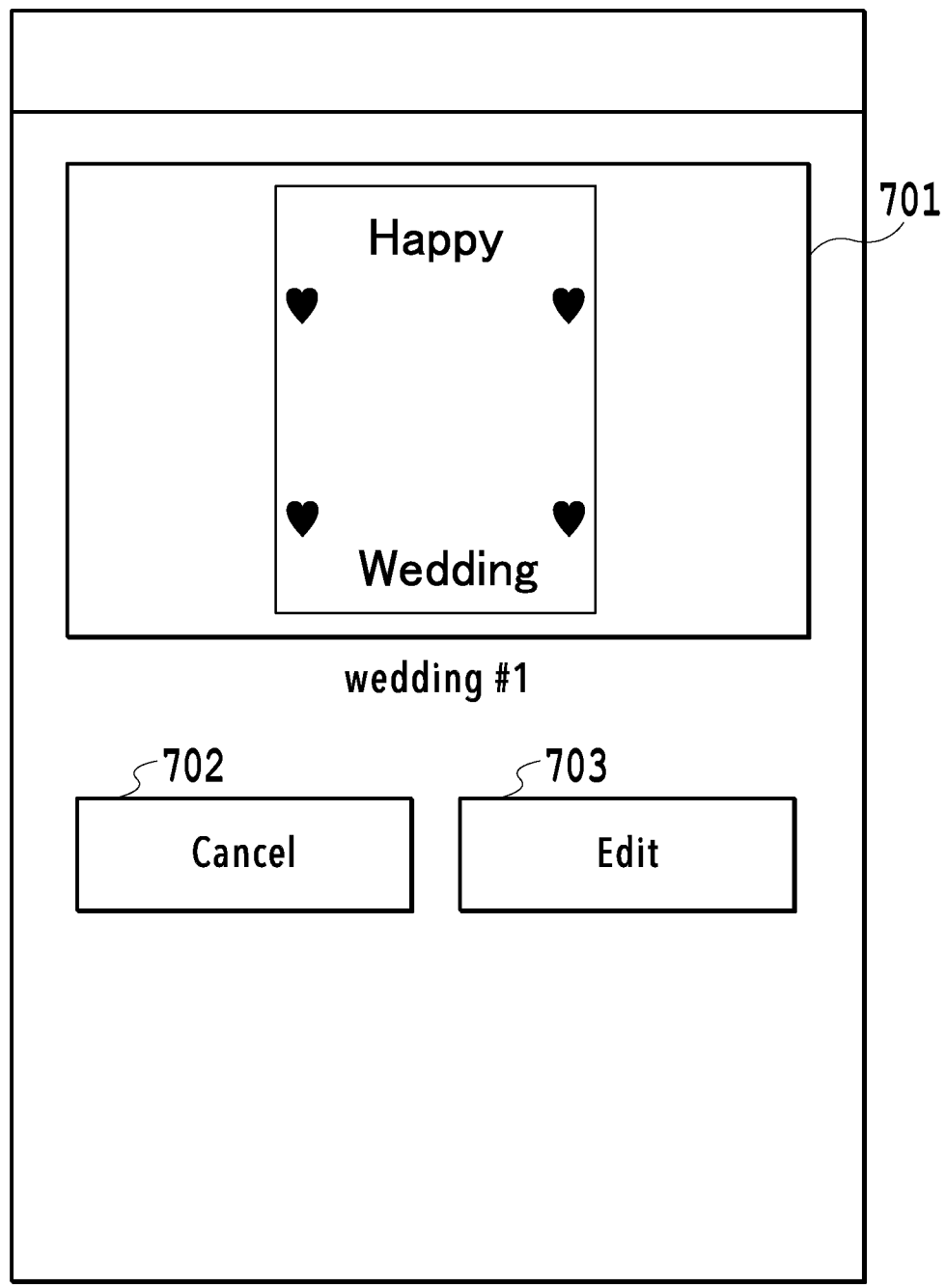
FIG. 7 is a diagram showing an example of an animation check screen.
Figure 8:
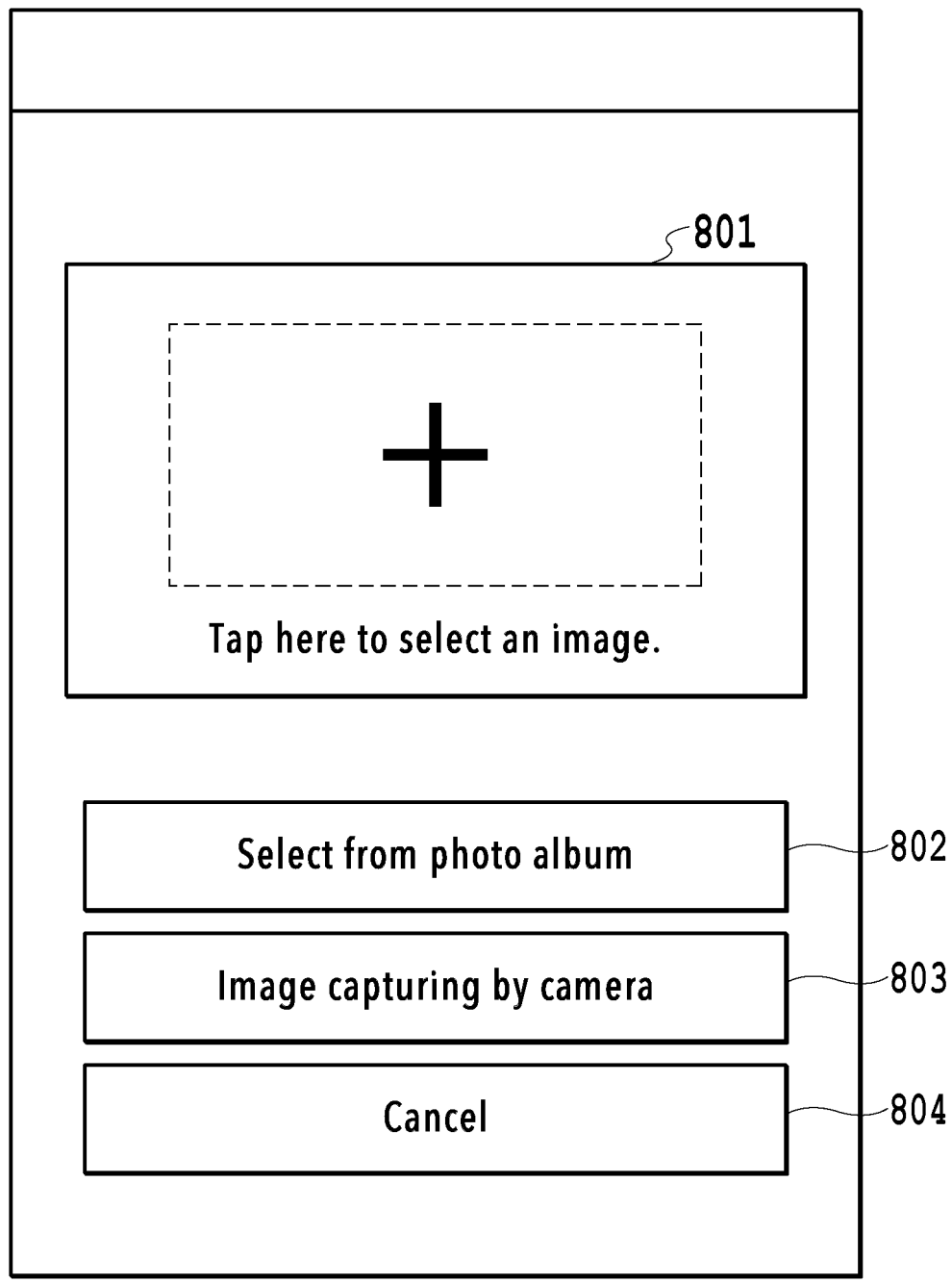
FIG. 8 is a diagram showing an example of an image selection screen.

In the case when a user selects animation by operating the animation selection screen, the image processing application displays an animation check screen (step S502). FIG. 7 is a diagram showing an example of the animation check screen. The image processing application displays animation selected on the application selection screen in a preview area 701 on the animation check screen. In FIG. 7, the selected animation is displayed in the portrait mode, but as long as the aspect is such that the selected animation can be checked, it may be possible to display animation in the preview area 701 in any display method. In the case when a user taps a Cancel button 702, the image processing application terminates the display of the animation check screen and returns the screen display to the animation selection screen. On the other hand, in the case when a user taps an Edit button 703, the image processing application causes the screen display to make a transition into an image selection screen shown in FIG. 8 (step S503). FIG. 8 is a diagram showing an example of the image selection screen. In the case when an image insertion area 801 or a "Select from photo album" button 802 is tapped on the image selection screen, a list of photos (images) saved within the terminal apparatus is displayed. It is possible for a user to select a desired image from the list. The selected image is displayed in the image insertion area 801. Further, in the case when an "Image capturing by camera" button 803 is tapped, a camera application activates. It is possible for a user to perform image capturing by the camera 119 by operating the camera application. Then, an image obtained by image capturing is displayed in the image insertion area 801. In this manner, it is possible for a user to select a printing-target image (original image of printed matter) on the image selection screen. In the case when a user taps a Cancel button 804, the image processing application terminates the display of the image selection screen and returns the screen display to the animation check screen.

Next, the image processing application determines whether the direction of the printing-target image selected on the image selection screen is the vertical direction or the horizontal direction (step S504). As a method of determining the direction of an image, a determination is performed based on direction information (for example, Exif information of JPEG) included in image data. In the case when direction information is not included in image data, it may also be possible to perform a determination by the aspect ratio of an image. For example, it may also be possible to determine the direction to be the horizontal direction in the case when the aspect ratio (for example, a value whose denominator is the number of pixels in the vertical direction of the image and whose numerator is the number of pixels in the horizontal direction) of the image is 1 or greater, and to determine the direction to be the vertical direction in the other cases.

In the case when the printing-target image is in the vertical direction (YES at step S504), the image processing application specifies animation belonging to the category selected on the animation selection screen and whose display method is the portrait from the animation management information. Then, the image processing application saves IndexNo corresponding to the specified animation in the data memory 113 (step S505). At this time, for example, in the case when the animation selected on the animation selection screen is wedding #1, 1 is saved as IndexNo. Further, for example, in the case when the animation selected on the animation selection screen is wedding #2, 3 is saved as IndexNo. In the case when the printing-target image is in the horizontal direction (NO at step S504), the image processing application specifies animation belonging to the category selected on the animation selection screen and whose display method is the landscape from the animation management information. Then, the image processing application saves IndexNo corresponding to the specified animation in the data memory 113 (step S506). At this time, for example, in the case when the animation selected on the animation selection screen is wedding #1, 2 is saved as IndexNo. Further, for example, in the case when the animation selected on the animation selection screen is wedding #2, 4 is saved as IndexNo. As described above, a user selects a desired category of a plurality of categories of animation by selecting one of the buttons 601 to 604. Then, whether animation data of the portrait display method or animation data of the landscape display method is selected of the desired category is determined automatically at steps S504 to S506. Because of this, appropriate animation data corresponding to the desired category and in accordance with the direction of the printing-target image is selected without a user selecting animation data by taking into consideration the direction of the printing-target image.

Figure 9A:
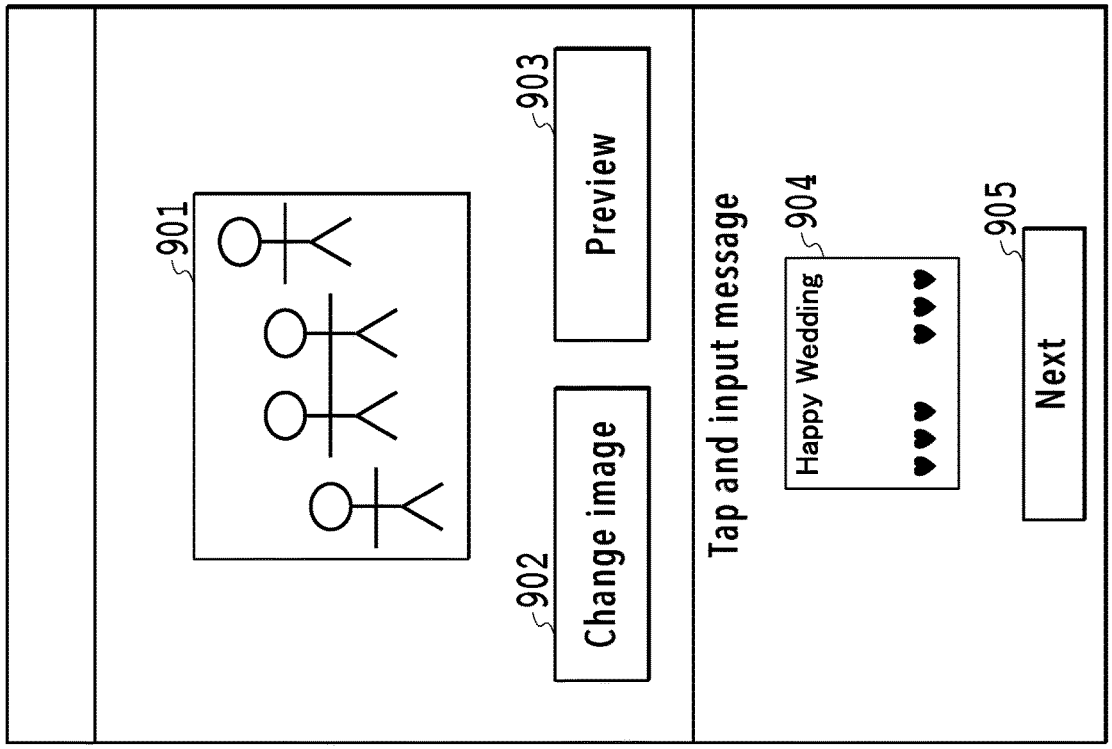
FIG. 9A and FIG. 9B are diagrams showing an example of an editing screen.
Figure 9B:
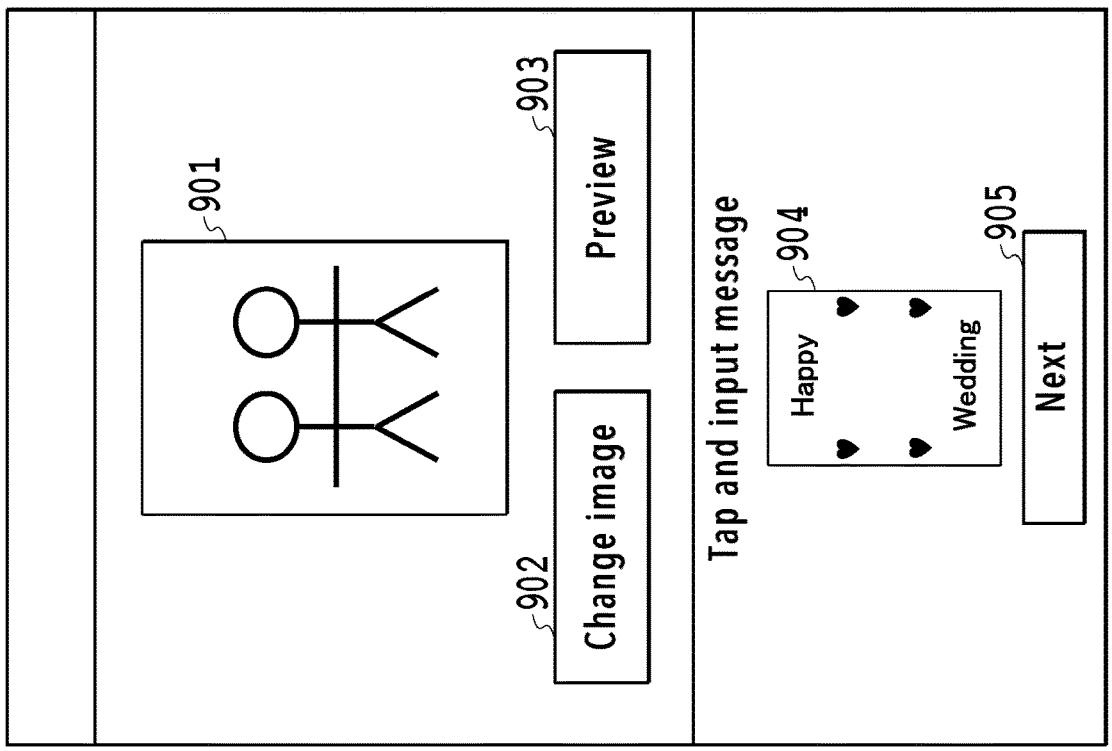

Next, the image processing application displays an editing screen shown in FIG. 9A and FIG. 9B (step S507). In FIG. 9A, an example of the editing screen that is displayed in the case when an image in the vertical direction is selected as a printing-target image is shown. In FIG. 9B, an example of the editing screen that is displayed in the case when an image in the horizontal direction is selected as a printing-target image is shown. A user edits a decoration message that is embedded in a printing-target image on the editing screen. By a Change image button 902 on the editing screen, it is possible to change a printing-target image. In the case when a Preview button 903 is tapped, the image processing application displays the results (image) of superimposing a decoration message on the printing-target image in a preview area 901. In a selected animation check area 904, the animation specified by the processing at steps S504 to S506 is displayed.

Figure 10:
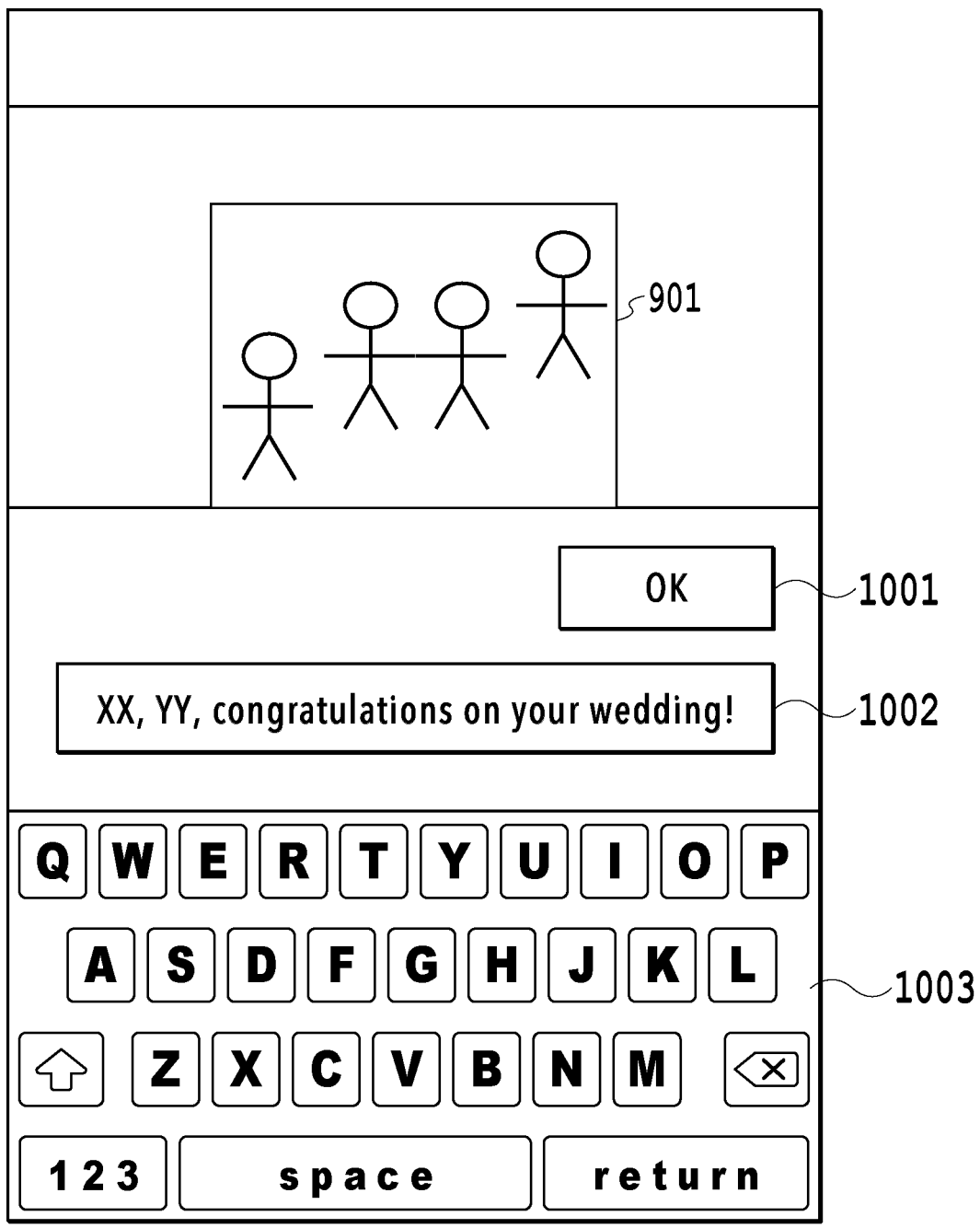
FIG. 10 is a diagram showing an example of a message input screen.

In the case when the selected animation check area 904 is tapped on the editing screen, the image processing application determines that a user inputs a message (YES at step S508) and displays a message input screen shown in FIG. 10 (step S509). FIG. 10 is a diagram showing an example of the message input screen. A user inputs a text message, which is a part of the decoration message that is embedded in the printing-target image, on the message input screen by using a software keyboard 1003 displayed at the bottom of the screen. The input text message is displayed in a message display area 1002. In the case when an OK button 1001 is tapped, the image processing application terminates the message input screen and returns the screen display to the editing screen. That is, the processing returns to step S507. At this time, the image processing application saves the input text message in the data memory 113.

Figure 11:
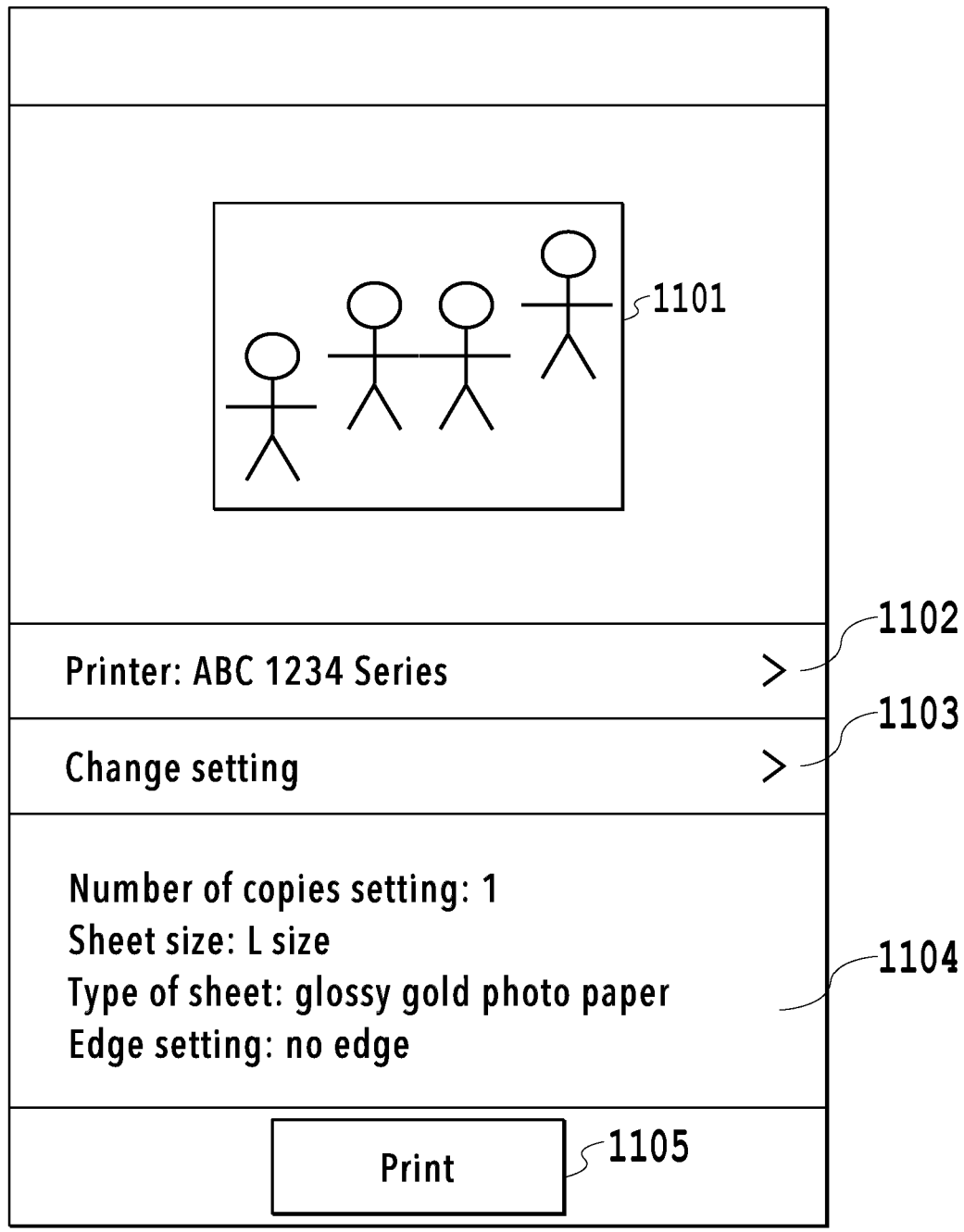
FIG. 11 is a diagram showing an example of a printing setting screen on which to perform printing setting of a printer.

In the case when a "Next" button 905 is tapped on the editing screen (NO at step S508), the image processing application displays a printing setting screen shown in FIG. 11 (step S510). FIG. 11 is a diagram showing an example of the printing setting screen on which printing setting of a printer is performed. In a preview area 1101, a preview of the selected printing-target image is displayed. In a target printer name display area 1102, the name of a printer that performs printing is displayed. Although a detailed explanation is omitted, it is possible to select a target printer by tapping the target printer name display area 1102. In a printing setting display area 1104, the printing setting that is set currently is displayed. In the present embodiment, it is possible to set Number of copies setting, Sheet size, Type of sheet, and Edge setting. In the case when a Change setting button 1103 is tapped, a screen (not shown schematically) for changing the printing setting is displayed and, on the screen, it is possible to change the printing setting displayed in the printing setting display area 1104. In the present embodiment, it is assumed that print contents (image taken to be a target of printing) is described by SVG (Scalable Vector Graphics), which is one of the graphics description methods in HTML.

A user gives instructions to perform printing by tapping a Print button 1105 after performing a desired printing setting on the printing setting screen. Upon receipt of the instructions to perform printing, the image processing application generates print data (step S511) and transmits the print data to the printer (here, the printing apparatus 20) (step S512). Due to this, the printed matter in which additional information is embedded is output by the printer.

Figure 12:
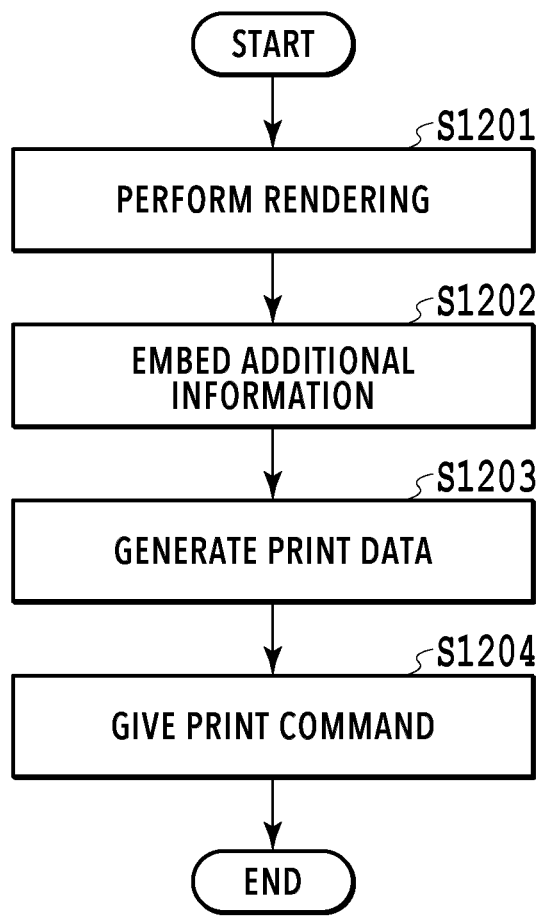
FIG. 12 is a flowchart showing print data generation processing.

Here, the processing (print data generation processing) at step S511 is explained. FIG. 12 is a flowchart showing the print data generation processing.

Upon receipt of the instructions to perform printing, the image processing application generates raster data of RGB by performing rendering for the image data in the SVG format generated by the processing up to step S511 (step S1201)

Next, the image processing application embeds additional information in the raster data by using the information multiplexing technique (step S1202). At this time, the image processing application includes IndexNo corresponding to the animation saved in the data memory 113 at steps S505 and S506, and the text message saved in the data memory 113 at step S508 in the additional information. In the present embodiment, an information multiplexing method of embedding additional information in a state when it is difficult to visually recognize the additional information is used. By adopting such a multiplexing method, the appearance of a printed image is not marred, unlike the multiplexing method of including an AR tag, and the like, in a partial area of printed matter, as described in Japanese Patent Laid-Open No. 2013-026922. As the method of embedding additional information in printed matter or as the method of extracting additional information from a scanned image, it may also be possible to use a well-known technique and a detailed explanation is omitted.

Next, the image processing application converts the raster data in which additional information is embedded into print data (JPEG data) (step S1203). In the case when the printer is capable of printing data in a file format (for example, PDF) other than JPEG, it may also be possible to convert the raster data into data in a file format other than JPEG. Lastly, the image processing application gives a print command (print control command) to the generated print data (step S1204).

<Decoration Message Display Processing>

Figure 13:
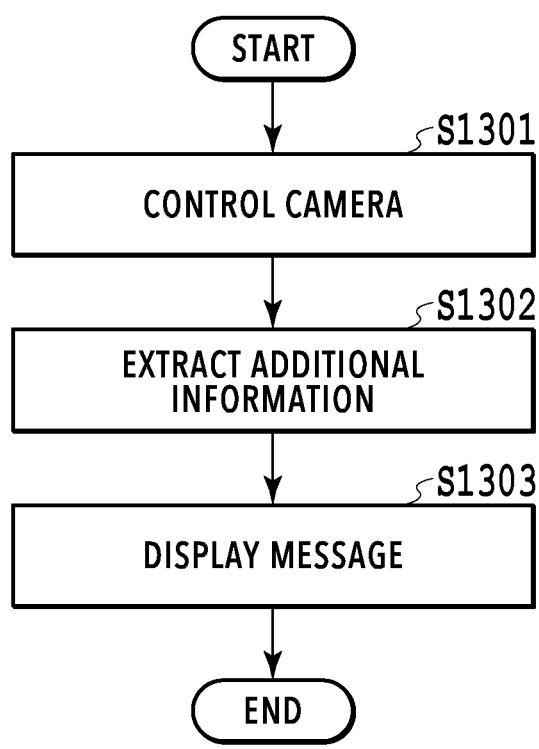
FIG. 13 is a flowchart of decoration message display processing.

With reference to FIG. 13, the decoration message display processing at step S304 is explained. FIG. 13 is a flowchart of the decoration message display processing.

Figure 14:
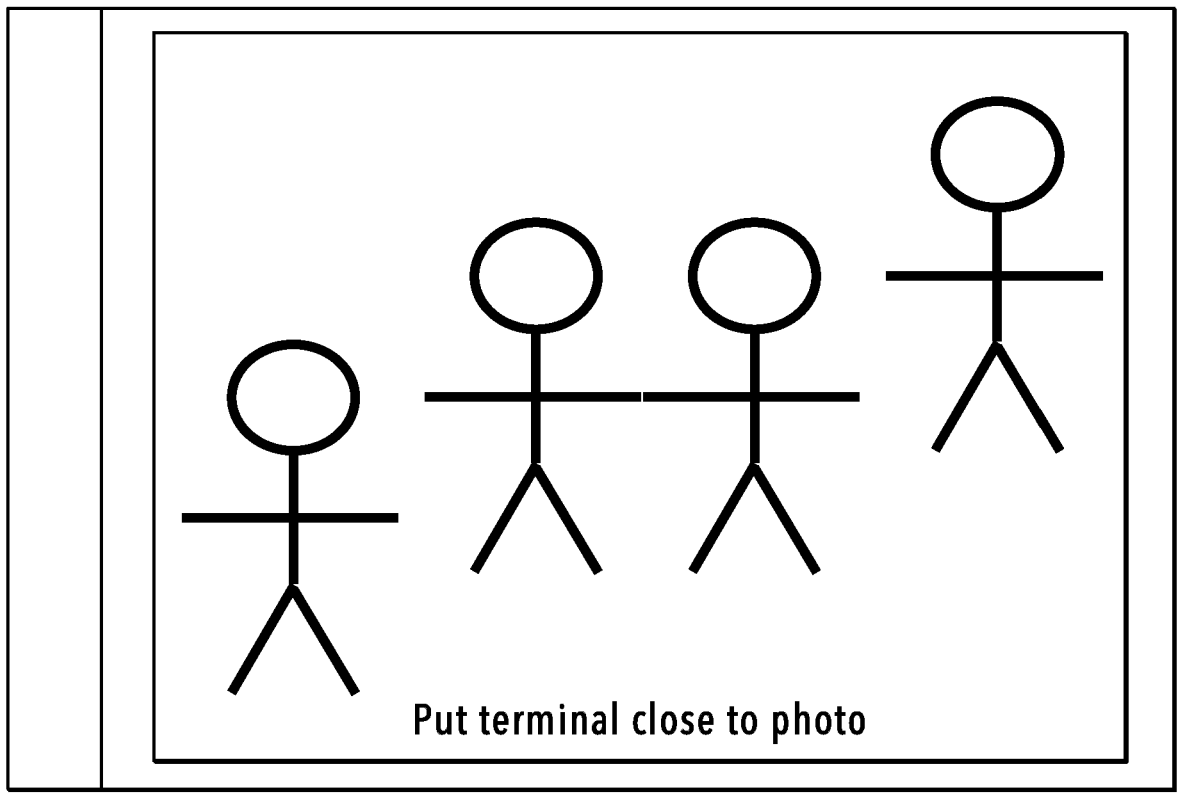
FIG. 14 is a diagram showing an example of a screen of the terminal apparatus in the case of scanning printed matter in which additional information is embedded in a portrait mode.

In the case when a transition is made into the decoration message display processing, the image processing application activates a camera application and brings about a state where it is possible to capture printed matter (step S1301). Then, a user operates the camera application and scans the printed matter in which additional information is embedded (more specifically, printed matter printed based on the print data in which additional information is embedded). Here, the scan is the operation to read an image printed on printed matter by capturing the printed matter. Consequently, in the following, there is a case when a scanned image is represented as a captured image. FIG. 14 is a diagram showing an example of the screen of the terminal apparatus 100 in the case when printed matter, in which additional information is embedded, is being scanned in the portrait mode. The image processing application extracts (separates) additional information from the scanned image (step S1302). At this time, as additional information, IndexNo is extracted. Further, in the case when a user inputs a message at step S509, the text message is extracted along with IndexNo. The "portrait mode" and "landscape mode" here indicate the relationship of the direction between the terminal apparatus 100 and printed matter at the time of a scan. That is, the terminal apparatus 100 displays a message based on additional information in the same direction in either of the modes. Then, by the terminal apparatus 100 or printed matter being rotated by a user at the time of scan, the above-described two modes are switched.

Figure 15A:
FIG. 15A and FIG. 15B are diagrams showing examples of a screen on which a decoration message is displayed in a superimposing manner on an image obtained by scanning printed matter.
Figure 15B:
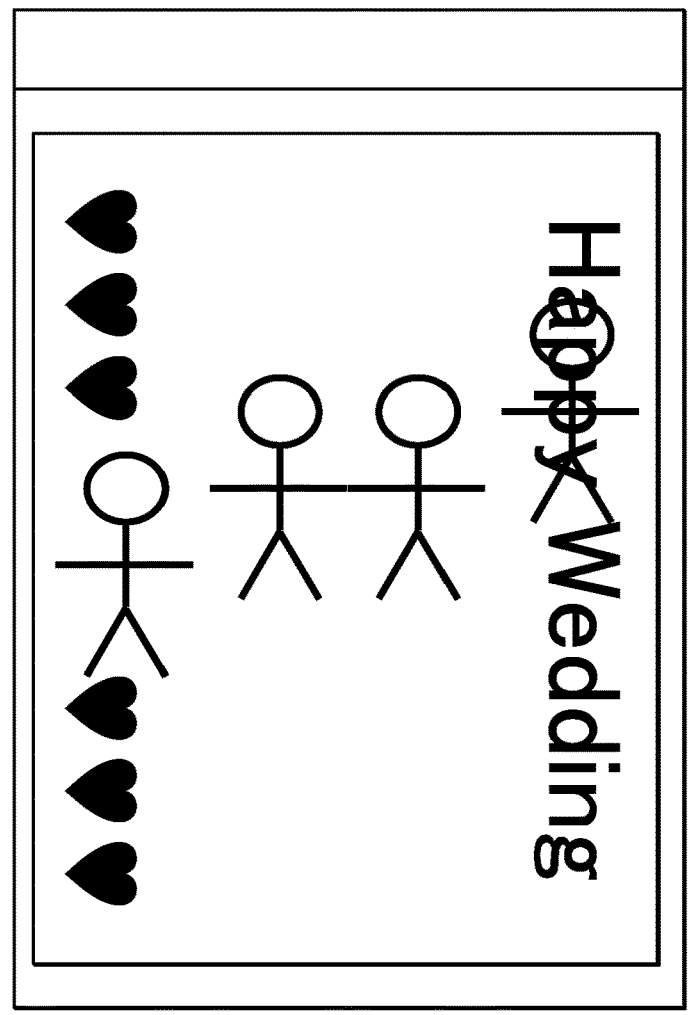
Figure 16A:
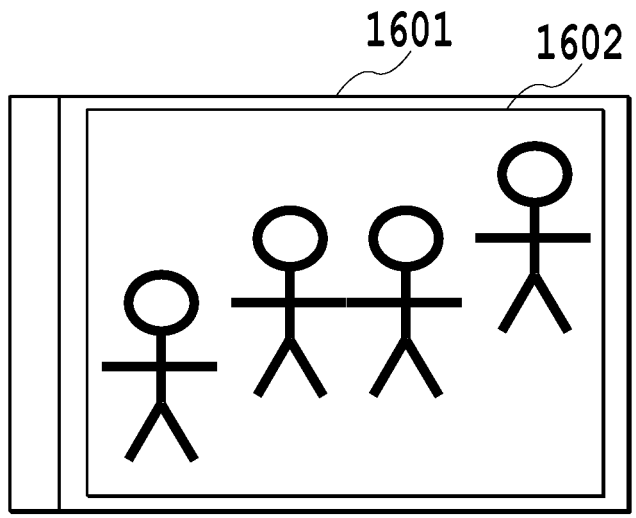
FIG. 16A to FIG. 16D are diagrams for explaining the prior art.
Figure 16B:
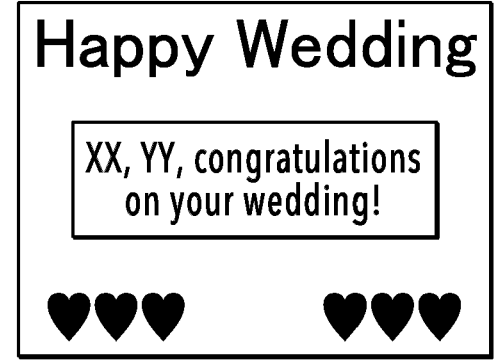
Figure 16C:
Figure 16D:

Next, the image processing application specifies the type (here, wedding #1, wedding #2, birthday #1, or birthday #2) of the animation embedded in the scanned image from the extracted IndexNo. Further, the image processing application specifies the display method (here, portrait or landscape) of the animation from the extracted IndexNo. The image processing application reads the animation data corresponding to the specified type and display method from the nonvolatile memory 120. Because the animation is specified uniquely by IndexNo, it may also be possible to read the animation data corresponding to IndexNo from the nonvolatile memory 120 without referring to the type of the animation. The image processing application displays the scanned image of the printed matter by superimposing the animation thereon on the screen (touch panel display 104) of the terminal apparatus 100 by using the read animation data (step S1303). Further, in the case when the text message is extracted at step S1302, the image processing application displays the text message in a superimposing manner on the scanned image in accordance with the display method of the animation. FIG. 15A shows an example of the screen on which the decoration message is displayed in a superimposing manner on the image obtained by scanning the printed matter in the landscape mode. FIG. 15B shows an example of the screen on which the decoration message is displayed in a superimposing manner on the image obtained by scanning printed matter in the portrait mode. In the example shown in FIG. 15A, it is assumed that IndexNo "2" and a text message "XX, YY, congratulations on your wedding!" are embedded in the printed matter. Further, in the example shown in FIG. 15B, it is assumed that only IndexNo "2" is embedded in the printed matter. In FIG. 15B, the decoration message is not rotated automatically even in the case when that direction of the terminal apparatus 100 changes. Specifically, at step S1303, the image processing application specifies the display direction as well as displaying the animation for the OS. This display direction is determined by the display method (here, portrait or landscape) of the animation specified from the additional information at step S1302. As described above, in the case when the display direction is specified, the OS does not perform automatic rotation of the display in accordance with the direction of the terminal apparatus 100 (for example, the direction detected by a sensor included in the terminal apparatus 100). However, as shown in FIG. 16D, the automatic rotation of the display may be performed.

As described above, in the present embodiment, the display direction (display method) of animation that is displayed in a superimposing manner on a captured image (scanned image) obtained by capturing printed matter is determined in accordance with the direction of a printing-target image. Then, information capable of specifying at least the type of animation and the determined display direction of the animation is embedded in the print data of the printed matter as additional information. Further, the additional information (IndexNo) is extracted from the scanned image obtained by scanning the printed matter, and the type and the display direction of animation that should be superimposed on the scanned image are specified. Due to this, for example, as shown in FIG. 15B, in the case when the printed matter in which IndexNo (2 or 4) corresponding to the landscape display method is embedded is scanned in the portrait mode, the animation of the landscape display method is displayed in the vertical direction. Because of this, it is possible for a user to determine that the printed matter should be scanned in the landscape mode. As described above, according to the present embodiment, it is possible to cause a user to recognize the appropriate scan direction of the printed matter in which additional information is embedded. Consequently, it is possible to display animation in a superimposing manner on a scanned image in accordance with the intention of a creator (user who has created animation by operating the screen in FIG. 6A and FIG. 6B to FIG. 10).

In the present embodiment, the example is explained in which IndexNo corresponding to animation and a text message are embedded as additional information. However, it may also be possible to embed information indicating the direction of a printing-target image, which is determined on the editing screen shown in FIG. 9A and FIG. 9B, as additional information in addition thereto. According to such an aspect, it is possible for the image processing application to determine whether printed matter is scanned in the appropriate direction. Due to this, for example, before animation is displayed in a superimposing manner, that is, before step S1303 is performed, it is made possible to notify a user that the scan direction of the printed matter is not appropriate or to prompt a user to change the scan direction.

Further, in the present embodiment, an explanation is given by taking the image processing application that performs the decoration message embedment processing and the decoration message display processing as an example. However, an application that performs the decoration message embedment processing and another application that performs the decoration message display processing may be installed respectively in the terminal apparatus 100. Then, it may also be possible for the CPU 111 of the terminal apparatus 100 to perform the processing in accordance with each of the applications. Further, an application that performs the decoration message embedment processing and another application that performs the decoration message display processing may be installed in different terminal apparatuses, respectively. In such a case, each of the terminal apparatuses holds the above-described animation management information. It may also be possible to store animation management information in a common storage device that can be accessed from each terminal apparatus.

Further, for example, a table capable of uniquely identifying the type of an object (category selected by a user in FIG. 6A) and animation data corresponding to the direction of an original image to be printed may be stored in the program memory 112 or in the nonvolatile memory 120. Then, at the time of embedding additional information, it may also be possible to specify the animation data corresponding to a combination of the category specified by a user and the direction of the original image from the above-described table and to embed the data in the original image by reading the data. In this case, the display direction of the animation may not be determined at the time of embedment of the additional information. Further, at the time of capturing printed matter and displaying animation, the display direction may be determined by the animation data. For example, the display direction of animation may be specified by the number of pixels of the animation data specified by additional information, information of the header portion of the animation data file, and so on.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the present invention, it is possible to embed additional information so that an appropriate object corresponding to the display direction in accordance with the direction of an original image is displayed.

Further, it may also be possible for an operating system (OS), or the like, running on a computer to perform part or all of the actual processing based on instructions of a program and one or more of the functions of the embodiment described previously may be implemented by the processing.

Furthermore, it may also be possible to write a program read from a storage medium in a memory included on a function extension board inserted into a computer or in a function extension unit connected to the computer. Then, it may also be possible for a CPU, or the like, included on the function extension board or in the function extension unit to perform part or all of the actual processing based on instructions of the program and one or more of the functions of the embodiment described previously may be performed by the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus that embeds additional information relating to an object that is displayed in a superimposing manner on a captured image, in an original image, the image processing apparatus comprising:
 a determining unit configured to determine whether a direction of the original image is a landscape or a portrait; and
 an embedment unit configured to embed the additional information in the original image,
 wherein the additional information is information capable of at least specifying a type of the object and a display direction, of the object with respect to a display screen, in a case of displaying the object in a superimposing manner on the captured image, and
 wherein the embedment unit embeds the additional information based on the determination by the determining unit, such that the display direction changes in accordance with whether the direction of the original image is the landscape or the portrait.

2. The image processing apparatus according to claim 1, wherein the shape of the display screen is a rectangle, and the display direction of the object is changed, such that, in a case when the direction of the original image is the landscape, the vertical direction of the object is a short length direction of the display screen and in a case when the direction of the original image is the portrait, the vertical direction of the object is a longitudinal direction of the display screen.

3. The image processing apparatus according to claim 1, wherein the object is animation.

4. The image processing apparatus according to claim 1, further comprising:
 an acquiring unit configured to acquire the additional information extracted from a captured image obtained by capturing a printed matter of the original image;
 a specification unit configured to specify a type and a display direction of the object from the additional information acquired by the acquiring unit; and
 a display unit configured to cause the display screen to display the object, such that the object of the type specified by the additional information is superimposed on the captured image in accordance with the display direction specified by the additional information.

5. The image processing apparatus according to claim 4, wherein the embedment unit embeds information capable of specifying a type selected by a user from a plurality of types of an object.

6. The image processing apparatus according to claim 5, further comprising:
 a management table that stores identification information allocated uniquely to each object in association with a type of the object and a display direction of the object,
 wherein the embedment unit:

acquires the identification information corresponding to the display direction of the object and the type of the object selected by a user from the management table; and embeds the acquired identification information in the original image as the additional information, and wherein the specification unit specifies a type and a display direction of an object that is displayed in a superimposing manner on the captured image from the management table and the identification information included in the additional information acquired by the acquiring unit.

7. An image processing apparatus comprising:

an acquiring unit configured to acquire additional information extracted from a captured image obtained by capturing printed matter; and a display unit configured to cause a display screen to display an object, such that the object is superimposed on the captured image in accordance with the additional information wherein the additional information includes information capable of at least specifying a type of the object and a display direction of the object, and the display unit causes the display screen to display the object, such that the object of the type specified by the additional information is superimposed on the captured image in accordance with the display direction specified by the additional information.

8. The image processing apparatus according to claim 7, wherein the display direction of the object is a direction with respect to the display screen.

9. The image processing apparatus according to claim 7, further comprising an embedment unit configured to embed the additional information in the original image, such that the display direction of the object changes in accordance with the direction of the original image.

10. The image processing apparatus according to claim 7, wherein the acquiring by the acquiring unit and the specification by the specification unit are executed by an application.

11. The image processing apparatus according to claim 10, wherein an operating system, on which the application is executed, does not perform automatic rotation for the object.

12. An image processing method of embedding additional information relating to an object that is displayed in a superimposing manner on a captured image, in an original image, the image processing method comprising:

a determining step of determining whether a direction of the original image is a landscape or a portrait; and an embedment step of embedding the additional information in the original image, wherein the additional information is information capable of at least specifying a type of the object and a display direction, of the object with respect to a display screen, in a case of displaying the object in a superimposing manner on the captured image, and wherein the embedment step embeds the additional information based on the determination in the determining step, such that the display direction changes in accordance with whether the direction of the original image is the landscape or the portrait.

13. The image processing method according to claim 12, wherein the shape of the display screen is a rectangle, and the display direction of the object is changed, such that, in a case when the direction of the original image is the landscape, the vertical direction of the object is a short length direction of the display screen, and in a case when the direction of the original image is the portrait, the vertical direction of the object is a longitudinal direction of the display screen.

14. The image processing method according to claim 12, wherein the object is animation.

15. The image processing method according to claim 12, further comprising:

an acquiring step of acquiring the additional information extracted from a captured image obtained by capturing a printed matter of the original image;

a specification step of specifying a type and a display direction of the object from the additional information acquired in the acquiring step; and a display step of causing the display screen to display the object, such that the object of the type specified by the additional information is superimposed on the captured image in accordance with the display direction specified by the additional information.

16. The image processing method according to claim 15, wherein, in the embedment step, information capable of specifying a type selected by a user from a plurality of types of an object is embedded.

17. The image processing method according to claim 16, wherein, in the embedment step:

the identification information corresponding to the display direction of the object and the type of the object selected by a user is acquired from a management table that stores identification information allocated uniquely to each object in association with a type of the object and a display direction of the object; and the acquired identification information is embedded in the original data as the additional information, and wherein, in the specification step, a type and a display direction of an object that is displayed in a superimposing manner on the captured image are specified from the management table and the identification information included in the additional information acquired in the acquiring step.

18. An image processing method comprising:

an acquiring step of acquiring additional information extracted from a captured image obtained by capturing printed matter; and a display step of causing a display screen to display an object, such that the object is superimposed on the captured image in accordance with the additional information wherein the additional information includes information capable of at least specifying a type of the object and a display direction of the object, and, in the display step, causing the display screen to display the object, such that the object of the type specified by the additional information is superimposed on the captured image in accordance with the display direction specified by the additional information.

19. The image processing method according to claim 18, wherein the display direction of the object is a direction with respect to the display screen.

20. The image processing method according to claim 18, further comprising an embedding step of embedding the additional information in the original image, such that the display direction of the object changes in accordance with the direction of the original image.

21. The image processing method according to claim 18, wherein the acquiring by the acquiring step and the specification by the specification step are executed by an application.

22. The image processing method according to claim 21, wherein an operating system, on which the application is executed, does not perform automatic rotation for the object.

* * * * *